United States Patent [19]

Kincel

[11] 4,147,315

[45] Apr. 3, 1979

[54] TAPE TRANSPORT APPARATUS

[75] Inventor: Roger S. Kincel, Whittier, Calif.

[73] Assignee: BASF Aktiengesellschaft, Rheinland-Pfalz, Fed. Rep. of Germany

[21] Appl. No.: 852,330

[22] Filed: Nov. 17, 1977

[51] Int. Cl.$^2$ .......................... G03B 1/04; G11B 15/32
[52] U.S. Cl. ........................................ 242/192; 226/60
[58] Field of Search ................ 242/187, 192, 197–210, 242/65, 66; 226/60, 61; 360/137

[56] References Cited
U.S. PATENT DOCUMENTS

| | | | |
|---|---|---|---|
| 2,958,477 | 11/1960 | James et al. | 242/209 |
| 3,489,369 | 1/1970 | Ganske et al. | 242/187 |
| 3,526,371 | 9/1970 | Blackie et al. | 242/192 |

*Primary Examiner*—Leonard D. Christian
*Attorney, Agent, or Firm*—Fulwider, Patton, Rieber, Lee & Utecht

[57] ABSTRACT

Shock-resistant tape transport apparatus of the type which has supply and take-up reels that are driven by surface engagement of a capstan with the outermost layer of tape on each reel. Each reel is journaled in a separate pivot arm carriage that is urged pivotally toward the capstan, to maintain the surface engagement as the tape is driven from one reel to the other. Resistance to shock and vibration is achieved by providing each carriage with a counterweight to balance the mass of the corresponding tape reel, and with a pivotal mounting that automatically moves the pivot point of the carriage to compensate for changes in the mass of the reel as the tape is moved from one reel to the other.

19 Claims, 9 Drawing Figures

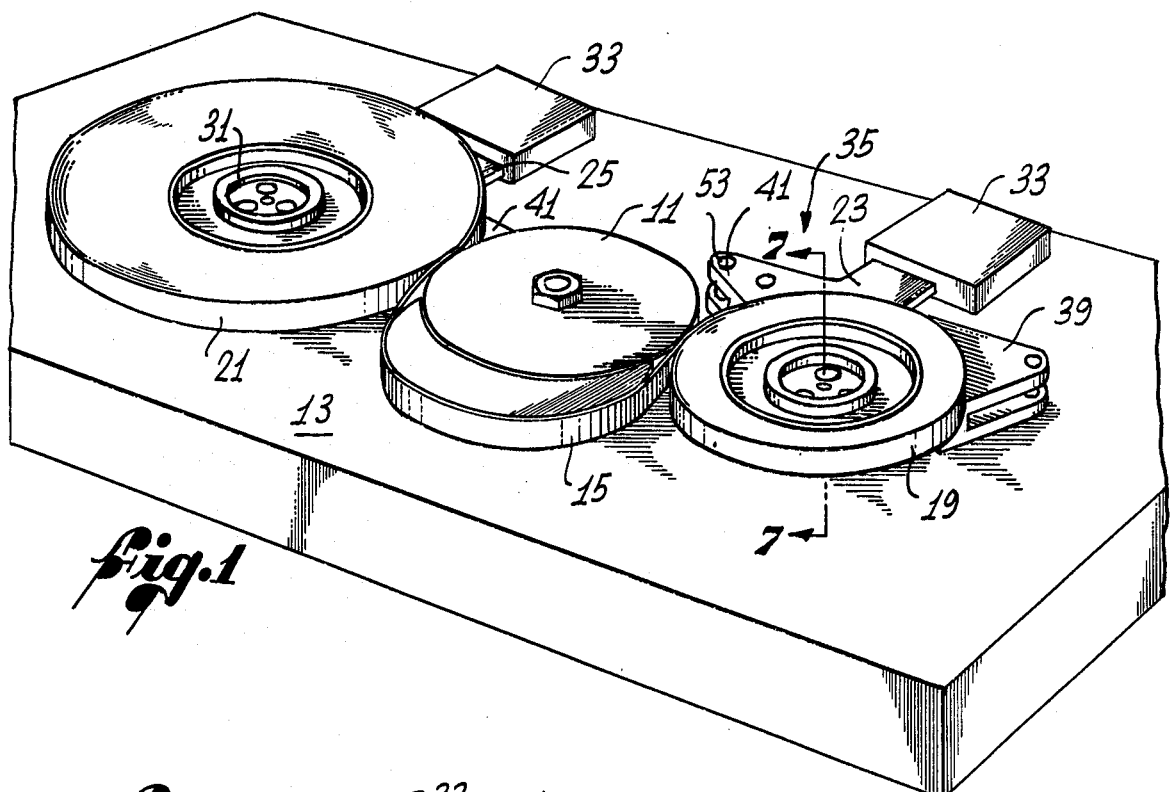
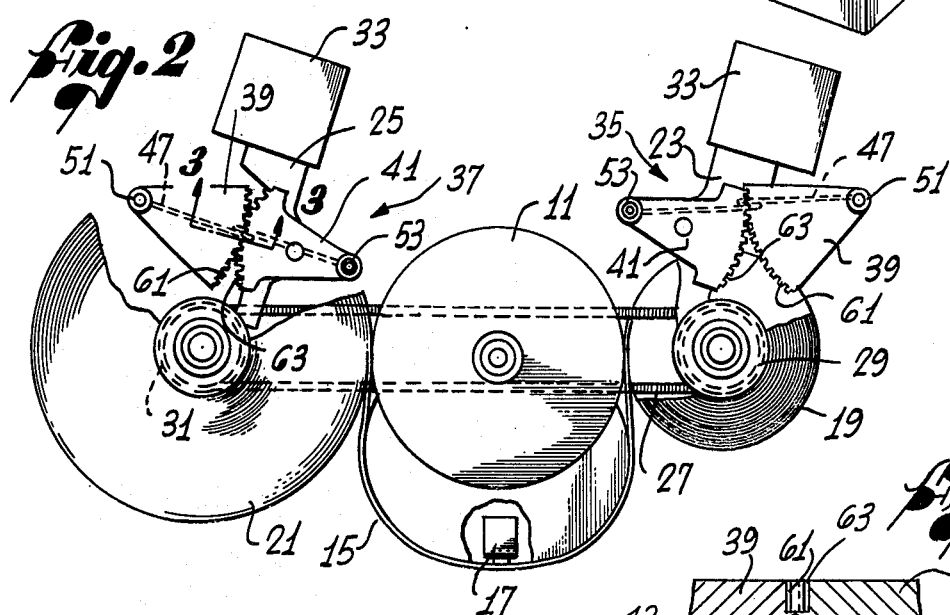
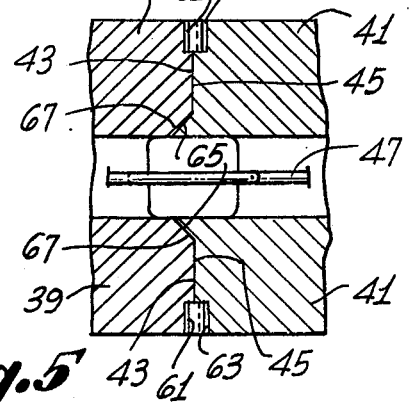
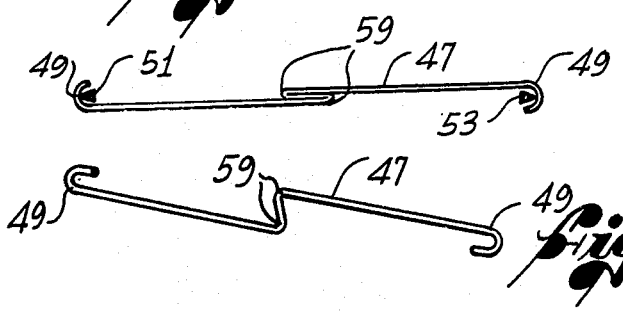

TAPE TRANSPORT APPARATUS

BACKGROUND OF THE INVENTION

This invention relates generally to tape transport apparatus and, more particularly, to magnetic recording tape transport apparatus of the type having supply and take-up reels journaled on carriages that are movable to bring the reels into surface engagement with a capstan.

An example of a tape transport apparatus of this general type is disclosed in U.S. Pat. No. 4,023,748, issued in the name of D. L. Burdorf et al and entitled "Cassette Loading and Tape Tensioning System". The apparatus described therein includes a pair of movable pivot arms, each of which is pivoted at one end and carries a journaled reel of tape at the other end. The reels are urged by a spring force into compressive surface engagement with a capstan, whereby the recording tape is transferred from one reel, past a record/playback head, to the other reel. As the tape is so transferred, the diameters of the reels change accordingly and the pivot arms accommodate the changes by pivoting to maintain the outer layer of tape on each reel in contact with the capstan.

A major drawback arises when the aforedescribed prior art apparatus is used in portable devices, such as portable video tape recorders, which will be subject to shock or vibration. Shock and vibration forces will cause uncontrolled variations in the magnitude of the compressive force with which the reels are urged into engagement with the capstan, thereby introducing objectionable variations in the speed of the tape as it moves past the head. Moreover, substantial shock and vibration can frequently cause the reels to lose contact altogether with the capstan, sometimes resulting in the tape's becoming tangled and even breaking.

It will be appreciated from the foregoing that there is a definite need for a tape transport apparatus of the aforedescribed type that can withstand substantial shock and vibration without affecting the degree of compressive engagement with the capstan, thereby insuring a substantially constant tape speed. The present invention fulfills this need.

SUMMARY OF THE INVENTION

This invention resides in an improved tape transport apparatus of the type having supply and take-up reels which are each journaled on separate carriages and urged into surface engagement with a capstan. In accordance with the invention, each carriage has associated with it means for minimizing effects of shock and vibration forces on the degree of surface engagement of the reels with the capstan.

More particularly, a tape transport apparatus constructed in accordance with the present invention includes a chassis on which the capstan is mounted for rotation and on which the two carriages are pivotally mounted. The supply reel and the take-up reel are each journaled on a separate carriage, in spaced relationship with the carriage's pivotal mounting. The reels are urged by a common spring into compressive engagement with the capstan, whereby they are rotatively driven and the tape is transferred from the supply reel to the take-up reel. As the diameters of the reels change, the carriages pivot accordingly, to maintain the engagement of the reels with the capstan.

Each carriage is balanced about its pivot point, i.e. its mass, including that of the tape reel, is distributed in such a manner that shock or vibration forces act on the carriage as torque forces of substantially equal magnitude, but opposite direction. The balancing is achieved by counterweighting means, which are carried by each carriage and located to balance the carriage and its reel about the pivotal mounting. Uniform compressive engagement of the reels with the capstan is therefore maintained, even when the apparatus is subjected to substantial shock and vibration.

In accordance with an important aspect of the invention, the pivot point of each carriage is automatically movable, so that the carriage remains continuously balanced as the reel is wound or unwound. As the reel's diameter changes, the pivotal mounting operates in such fashion that the instantaneous pivot point is located approximately at the center of mass of the carriage, reel and counterweight assembly. In this manner, accurate balancing of the carriages is achieved even though, when the apparatus is in operation, the reel's mass is continuously changing.

Movement of the pivot point is effected by a rocker assembly associated with each carriage. Each rocker assembly includes a base block fixed to the chassis and rocker block fixed to the carriage. The base block and rocker block each have a rocking surface, and the assembly further includes means urging the two rocking surfaces into contact with each other. At least one of the two rocking surfaces is arcuate, whereby the rocker block rocking surface can rock on the base block rocking surface, i.e., the rocking surfaces are in rolling contact with each other. Thus the instantaneous pivot point of the carriage, i.e., the point of contact between the two rocking surfaces, can be continuously varied.

In operation, a change in the diameter of a tape reel causes the hub of the reel, and thus the end of the carriage on which the reel is journaled, to move with respect to the capstan. This movement of the carriage is accommodated by the rocker block's automatically moving in a rocking fashion on the base block, and results in a movement of the pivot point which automatically compensates for the change in mass and diameter of the reel.

Many other aspects and advantages of the present invention will become apparent from the following description of the preferred embodiment, taken in conjunction with the accompanying drawings, which disclose, by way of example, the principles of the invention.

BRIEF DESCRIPTION OF THE DRAWINGS

In the accompanying drawings:

FIG. 1 is simplified perspective view of a tape transport apparatus embodying the present invention;

FIG. 2 is a plan view of the apparatus of FIG. 1, with portions of the tape reels being cut away to reveal the rocker assemblies;

FIG. 3 is an enlarged fragmentary sectional view of a rocker assembly, taken substantially along the line 3—3 in FIG. 2 and showing the rocking surfaces in engagement;

FIG. 4 is a plan view of a coupling cable employed to retain the rocking surfaces of the rocker assemblies in engagement, the cable being shown with its end hooks looped around the posts of the base block and the rocker block, and with its reverse bends fully crimped;

FIG. 5 is a perspective view of the coupling cable of FIG. 4, prior to the crimping of its reverse bends;

DESCRIPTION OF THE PREFERRED EMBODIMENT

Figure 6:
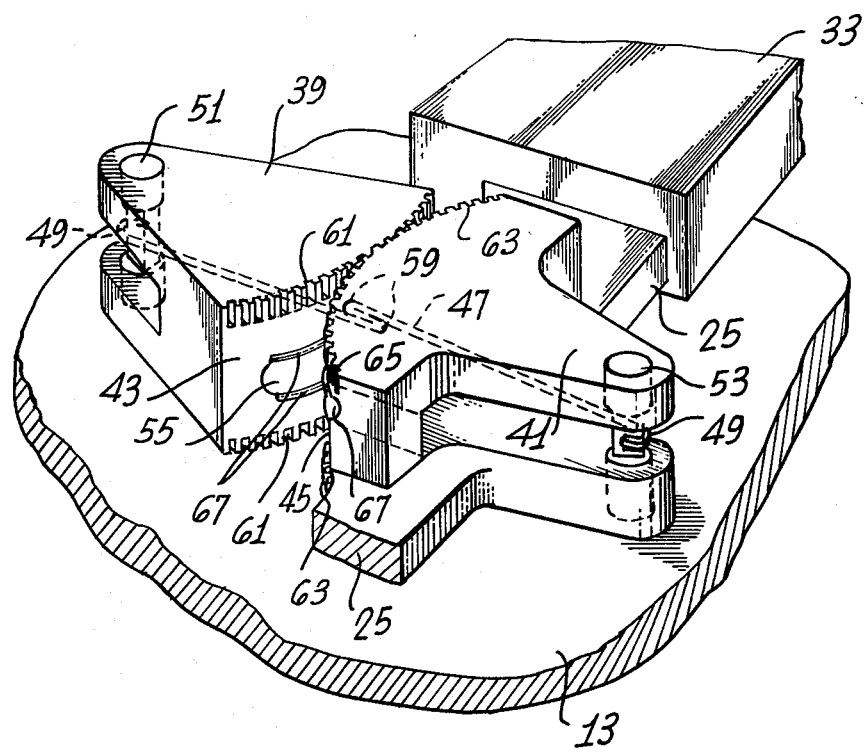
FIG. 6 is an enlarged perspective view of one of the rocker assemblies of FIG. 2.

FIGS. 1 and 2 illustrate a magnetic recording tape transport system constructed in accordance with one embodiment of the present invention. The system is shown as having a cylindrical capstan 11 that is mounted for rotation on a chassis 13 and is operative to drive a magnetic tape 15 past a record/playback transducer head 17. A supply reel 19 and a take-up reel 21, which are arranged in a generally coplanar relationship with the capstan, are driven by surface engagement of each reel's outermost layer of magnetic tape with the capstan.

The supply reel 19 is journaled in a first pivot arm carriage 23, and the take-up reel 21 is similarly journaled in a second pivot arm carriage 25. The journaled reels are urged into compressive engagement with the capstan 11 by a garter-type spring 27 that interconnects the respective carriages at pulley-like portions 29 and 31. The two carriages are both pivotally mounted to the chassis 13.

It will be apparent that, when the tape 15 from the supply reel 19 is driven past the record/playback head 17 to the take-up reel 21, the diameters of the respective reels will vary. The carriages 23 and 25 accommodate the reel diameter variations by pivoting freely on their respective mountings, moving the reel hubs toward and away from the capstan 11, and thereby maintaining compressive engagement between the tape and the capstan.

In accordance with the invention, both the first pivot arm carriage 23 and the second pivot arm carriage 25 carry a counterweight 33 to counterbalance the weight of their respective tape reels 19 and 21. In this manner, the carriages are balanced about their respective pivotal mountings and a uniform degree of compressive engagement of the reels with the capstan 11 is thereby maintained, even when the apparatus is subjected to shock or vibration in any direction.

For maximum resistance to shock and vibration, it is desirable that the location of each carriage's pivot point always be coincident with the center of mass of the entire carriage assembly, including the carriage, the corresponding tape reel and the corresponding counterweight. Since the mass of each tape reel varies during operation of the apparatus, each carriage assembly's center of mass is continuously moving. Best results are achieved if the carriage's pivot point always coincides with the center of mass. The first and second pivot arm carriages 23 and 25 are mounted on the chassis 11 by rocker assemblies 35 and 37, respectively. Each rocker assembly causes the corresponding carriage assembly's pivot point to "track" the assembly's center of mass with sufficient accuracy to achieve substantial resistance to shock and vibration.

Each of the rocker assemblies 35 and 37 is adapted to provide a fulcrum or pivot point for its corresponding carriage 23 or 25 that is automatically movable along a continuum of possible points as the corresponding reel diameter varies. When the reel diameter is smallest, and thus the reel 19 or 21 has its lowest mass, the pivot point has automatically moved to a point nearest the counterweight 33 and farthest from the reel hub. Similarly, when the reel diameter is largest, and thus the reel has its greatest mass, the pivot point has automatically moved to a point nearest the reel hub and farthest from the counterweight.

Thus, the pivot arm carriages 23 and 25, with their associated reels 19 and 21 and counterweights 33, are continuously counterbalanced as the reels are driven between full and empty conditions. Accordingly, when the apparatus is subjected to shock or vibration, no net rotational forces will be imparted to either pivot arm carriage, and substantially no variation in the compressive force of the engagement of the tape reels with the capstan 11 will result. Consequently, a substantially constant tape tension and tape speed can be maintained.

As shown in FIG. 2, each of the rocker assemblies 35 and 37 includes a base block 39 that is secured to the chassis 13, a rocker block 41 that is secured to the corresponding pivot arm carriage 23 or 25, and means for coupling the two blocks 39 and 41 to each other. The base block has a base block rocking surface 43, while the rocker block has a corresponding rocker block rocking surface 45 that is adapted to conformably rock on the base block rocking surface.

Herein, the two rocking surfaces 43 and 45 are both segments of cylinders having substantially equal radii. They abut each other with their longitudinal axes both parallel to the axes of rotation of the tape reels 19 and 21. The rocker block 41 can then rock on the base block 39 in a plane parallel to that of the capstan 11 and tape reels.

The instantaneous location at which the two rocking surfaces 43 and 45 abut each other serves as the pivot point or fulcrum of the corresponding pivot arm carriage 23 or 25. As the diameter of the corresponding tape reel 19 or 21 varies between its largest and smallest sizes, the tape reel hub, under the urging of the spring 27, automatically moves with respect to the capstan 11. This movement causes the rocker block 41 to rock on the base block 39, thereby causing the location of the engagement of the respective rocking surfaces to vary between the edges of the rocking surfaces nearest the tape reel and the edges of the rocking surfaces nearest the counterweight 33.

In the preferred embodiment of the invention, the means for coupling the rocker block 41 to the base block 39 comprises a tensile link in the form of a cable 47. The coupling prevents the rocker block from separating from the base block, while it permits the two blocks to rock relative to each other on their respective rocking surfaces. As shown in FIG. 4, the cable 47 is formed with hooks 49 at both of its ends. One hook is looped around a chassis post 51 located at the center of curvature of the base block rocking surface 43, while the other hook is looped around a carriage post 53 located on a laterally extending portion of the corresponding pivot arm carriage 23 or 25, at the center of curvature of the rocker block rocking surface 45. The cable extends through coupling slots 55 and 57 in the base block 39 and rocker block 41, respectively.

As shown in FIG. 5, to facilitate assembly of each of the rocker assemblies 35 and 37, the mid-portion of the cable 47 is initially formed to include a pair of reverse bends 59, of approximately 135° each. After the cable's end hooks 49 are looped around their corresponding posts 51 and 53, the reverse bends are crimped, to form 180° bends. This crimping effectively shortens the length of the cable and thereby tightens the coupling between the rocker block 39 and the base block 41, insuring that separation of the two rocking surfaces will not occur.

In an alternative embodiment, the coupling between the rocker block 39 and the base block 41 is made with a coil spring having a hook at each of its ends for looping around the respective posts 51 and 53. The spring tension must be large enough to insure that shock and vibration forces do not cause the two rocking surfaces to lose their abutting engagement.

It will be appreciated that the aforedescribed rocking motion can be effected by rocking surfaces having numerous arcuate shapes other than the equal-radius cylinder segments of the preferred embodiment. In fact, a more accurate balancing of the pivot arm carriages 23 and 25 can be achieved if the rocker block rocking surface 45 has no curvature at all. As will be described, however, an important benefit is realized by using the rocking surfaces of the preferred embodiment, i.e. a pair of equal-radius cylinder segments.

A beneficial result derived by using cylindrical rocking surfaces is that the rocker assembly of this form provides only minimal resistance to the rocking motion of the pivot arm carriages 23 and 25. Since the posts 51 and 53, between which the cable 47 is connected, are located at the respective centers of curvature of the rocking surfaces, the force that is applied by the cable is always aligned with the point of contact of the rocking surfaces. As a result, no net rotational force is exerted on the carriage by the rocker assembly as the carriage pivots through its entire range of motion, and only a negligible resistance to the rocking motion, due to friction, is encountered. With only negligible resistance to the rocking of the carriage, the uniform compressive force between the tape reels 19 and 21 and the capstan 11 can be maintained.

A further reduction in the resistance of the rocker assembly to the rocking motion of the pivot arm carriage 23 or 25, is accomplished by forming the posts 51 and 53 with knife edges (FIG. 4) for supporting the hooks 49 at the ends the cable 47. This causes the hooks to pivot, rather than slide on the posts, thereby reducing friction and correspondingly reducing still further the rocker assembly's resistance to rocking by the carriage.

In accordance with an important aspect of this invention, each of the rocker assemblies 23 and 25 also includes means for preventing relative slippage between its respective rocking surfaces 43 and 45.

As shown in FIG. 6, relative sliding motion of the rocking surfaces, along a direction parallel to the plane in which the carriages 23 and 25 move, is prevented by a pair of base block gear segments 61 and a pair of rocker block gear segments 63. The base block gear segments are arcuate, with the same radius as the base block rocking surface 43, and are carried by the base block 39 along the edges of its rocking surface. The rocker block gear segments are similarly arcuate and are carried by the rocker block 41 along the edges of its rocking surface 45.

Each base block gear segment 61 engages the corresponding rocker block gear segment 63, thereby preventing any sliding motion of the rocker block 41 relative to the base block 39, along a direction parallel to the plane in which the carriage moves. Similarly, the engagement of the gear segments prevents any rocking motion of the carriage about the axis of the cable 47 that couples the rocker block to the base block. At the same time, the engagement of the gear segments does not inhibit the normal operational rocking of the rocker block on the base block.

Relative sliding motion of the rocking surfaces along an axis perpendicular to the plane in which the carriage 23 or 25 moves (i.e. parallel to the rotational axis of the tape reels), is prevented by a tongue and groove combination. The combination includes a pair of arcuate tongues 65 extending along the rocker block rocking surface 45, adjacent its coupling slot 57, and a pair of corresponding arcuate grooves 67 extending in similar fashion along the base block rocking surface 43, adjacent the edges of its coupling slot 55.

Each tongue 65 engages its corresponding groove 67, to prevent relative sliding of the rocking surfaces 43 and 45 in directions perpendicular to the plane of the carriage's rocking motion. The top portions of the tongues preferably do not contact the bottom portions of the corresponding grooves, so that substantially the entire force of the compressive engagement of the rocker block 41 with the base block 39 is borne by the respective rocking surfaces.

Figures 7, 9:
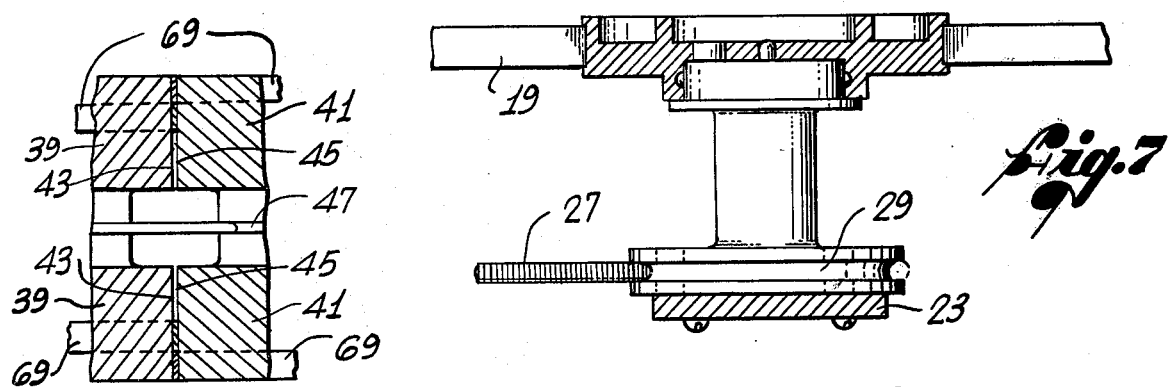
FIG. 7 is an enlarged sectional view of the journal on which a tape reel is mounted, taken substantially along the line 7—7 in FIG. 2.
FIG. 9 is an enlarged fragmentary section view of the rocker assembly of FIG. 8, taken substantially along the line 9—9.
Figure 8:
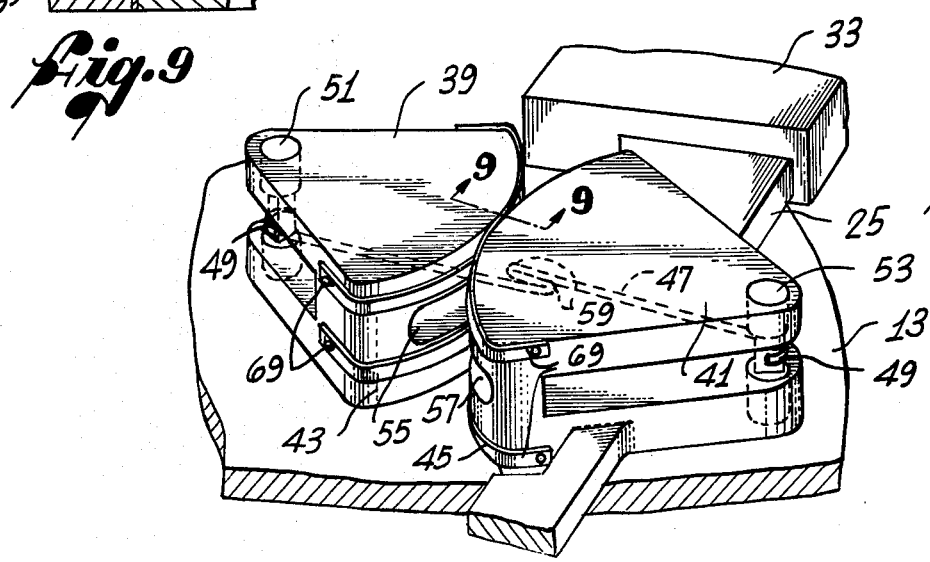
FIG. 8 is a perspective view of an alternate embodiment of the rocker assembly of the present invention.

FIGS. 8 and 9 show an alternate embodiment of the rocker assembly 35 or 37, in which relative sliding motion in any direction is prevented by four coupling bands 69 that interconnect the base block 39 and rocker block 41. The bands have a thin enough cross section to be easily bendable during use, but they are relatively non-resilient in a longitudinal sense, and may be made from spring steel or a similar material. Two of the bands extend in parallel relationship along the base block rocking surface 43, from its edge nearest the counterweight 33 to the point of engagement of the two rocking surfaces, and continue along the rocker block rocking surface 45 to its edge farthest from the counterweight. In similar fashion, the other two bands extend in parallel relationship along the rocker block rocking surface 45, from its edge nearest the counterweight to the point of engagement of the two rocking surfaces, and continue along the base block rocking surface 43 to its edge farthest from the counterweight. The two ends of each band are securely fixed to the base block 39 and the rocker block 41 at locations beyond the edges of their respective rocking surfaces.

The aforesaid arrangement of coupling bands 69 thus permits the rocker block 41 to move relative to the base block 39 only so long as the distance between the respective ends of each band does not increase. This restriction limits the relative motion to the aforedescribed rocking motion, preventing all other forms of relative motion.

From the foregoing description, it should be apparent that the present invention provides a simple yet effective means for adapting a tape transport apparatus to operate successfully in portable applications, where the apparatus can be subjected to substantial shock and vibration. Although the invention has been described in detail with reference its presently preferred embodi-

I claim:

1. In a tape transport apparatus having a chassis, a drive capstan and a pair of tape reels journaled on carriages and moved into surface engagement with the capstan, to drive the tape from one reel to the other, the improvement comprising:

pivotal mounting means for pivotally securing each of the carriages to the chassis, said pivotal mounting means including
a base block secured to said chassis, said base block having a first rocking surface,
a rocker block secured to the corresponding carriage, said rocker block having a second rocking surface, and
coupling means for urging the first and second rocking surfaces into engagement with each other, whereby said rocker block can pivotally rock on said base block, and the instantaneous pivot points for the carriages are moved automatically to compensate for changes in mass of the tape reels as tape is moved from one of the reels to the other; and
counterweighting means associated with each carriage for providing a center of mass of the carriage, the corresponding tape reel and counterweighting means substantially at said pivotal mounting means, thereby minimizing net rotational forces about said pivotal mounting means due to shock or vibration, and minimizing the effects of shock and vibration forces on the degree of surface engagement of the reels with the capstan.

2. A tape transport apparatus as defined in claim 1 wherein each of said pivotal mounting means further includes means for preventing relative slippage between the rocking surfaces.

3. In a tape transport apparatus having a chassis, a tape drive capstan and a pair of tape reels journaled on pivot arms and urged into surface engagement with the capstan, to drive the tape from one reel to the other, the improvement comprising:

counterweighting means carried by each of the pivot arms and located to provide a center of mass of the pivot arm, tape reel, and counterweighting means substantially at the pivot point of the pivot arm, whereby the surface engagement of the tape reels with the capstan is maintained when the apparatus is subjected to shock or vibration; and
pivotal mounting means for each of said pivot arms, said pivotal mounting means including
a base block having a first rocking surface, said base block being fixed relative to the chassis,
a rocker block having a second rocking surface, said rocker block being fixed to the pivot arm, and
means for urging said first and second rocking surfaces into engagement with each other, whereby said rocker block and pivot arm can pivotally rock on said base block, and the effective pivot point of said pivot arm is automatically movable to follow the center of mass of the pivot arm, tape reel and counterweighting means, and to thereby compensate automatically for changes in the mass of the tape reel as it winds or unwinds.

4. A tape transport apparatus as defined in claim 3 wherein each of said pivotal mounting means further includes means for preventing relative slippage between said rocking surfaces.

5. A tape transport apparatus comprising:

a chassis;
a pair of reels of recording tape serving as a supply reel and a take-up reel;
a pair of pivot arm carriages on which said reels are respectively journaled for rotational movement;
pivotal mounting means associated with each of said carriages for securing the carriages to said chassis;
capstan means rotatable with respect to said chassis, for simultaneously driving both of said reels by surface engagement with the outermost layer of tape on each reel;
means for urging both of said reels into compressive engagement with said capstan means; and
counterweighting means carried by each of said carriages for balancing said carriages about said pivotal mounting means, whereby the compressive engagement of said capstan means and said reels is maintained when the apparatus is subjected to shock or vibration.

6. A tape transport apparatus as defined in claim 5 wherein each of said pivotal mounting means includes:

a base block secured to said chassis, said base block having a first rocking surface;
a rocker block secured to the corresponding carriage, said rocker block having a second rocking surface; and
coupling means for urging said first and second rocking surfaces into engagement with each other, whereby said rocker block and said carriage can pivotally rock on said base block, and the instantaneous pivot points for said pivot arm carriages are moved automatically to compensate for changes in mass of said reels as tape is moved from said supply reel to said take-up reel.

7. A tape transport apparatus as defined in claim 6 wherein each of said pivotal mounting means further includes means for preventing relative slippage between said rocking surfaces.

8. A tape transport apparatus as defined in claim 7 wherein said means for preventing relative slippage includes at least one pair of gear segments carried by said base block and said rocker block.

9. A tape transport apparatus as defined in claim 7 wherein said means for preventing relative slippage includes a tongue and groove combination carried by said base block and said rocker block.

10. A tape transport apparatus as defined in claim 8 wherein said means for preventing relative slippage further includes a tongue and groove combination carried by said base block and said rocker block.

11. A tape transport apparatus as defined in claim 6 wherein said coupling means includes at least one pair of bands, the two bands in said pair extending in opposite directions along the first rocking surface, from opposite edges thereof to the point of engagement of the first and second rocking surfaces, and continuing in opposite directions along the second rocking surface, from the point of engagement of the first and second rocking surfaces to opposite edges of the second rocking surface, thereby permitting the second rocking surface to rock relative to the first rocking surface, while preventing the rocking surfaces from sliding relative to each other.

12. A tape transport apparatus as defined in claim 6 wherein said rocking surfaces are segments of cylinders having substantially equal radii.

13. A tape transport apparatus as defined in claim 12 wherein said coupling means for urging said rocking surfaces into engagement with each other comprises a tensile link interconnecting a first post located at the center of curvature of said first rocking surface and a second post located at the center of curvature of said second rocking surface.

14. A tape transport apparatus as defined in claim 13 wherein both of said first and second posts include knife edges that engage the respective ends of said tensile link.

15. A tape transport apparatus comprising:
a chassis;
a pair of reels of recording tape;
a pair of carriages mounted on said chassis, each carriage adapted to support a separate one of said reels for rotational movement thereon;
capstan means, rotatable with respect to said chassis, for driving each of said reels by compressive engagement with the outermost layer of tape thereon;
means for urging said reels into compressive engagement with said capstan means, to drive the tape from one reel to the other; and
means, operable regardless of changes in the masses of the reels as the tape is driven from one reel to the other, for preventing shock and vibration forces from significantly affecting the degree of compressive engagement of said reels with said capstan means.

16. A tape transport apparatus as defined in claim 15 wherein:
said apparatus further includes means for pivotally mounting each of said carriages to said chassis, said mounting means defining a pair of pivot axes, about which the carriages are pivoted to urge said reels into compressive engagement with said capstan means; and
said preventing means includes
counterweighting means carried by said pair of carriages for balancing the carriages about their respective pivot axes, and
means for moving each of said pivot axes in response to a change in the mass of the corresponding reel, thereby maintaining the pivot axis substantially at the center of mass of the reel, the carriage and the counterweighting means, and thereby minimizing net rotational forces about the pivot axis due to shock or vibration.

17. A portable video tape transport apparatus comprising:
a chassis;
a pair of reels of recording tape forming a supply reel and a take-up reel;
a pair of pivot arm carriages on which said reels are respectively journaled for rotational movement;
a pair of rocker assemblies by means of which said respective pivot arm carriages are pivotally mounted to said chassis, each of said rocker assemblies including
a base block secured to said chassis, said base block having a rocking surface in the shape of a segment of a cylinder, and a base block post located at the center of curvature of said base block rocking surface,
a rocker block secured to the corresponding pivot arm carriage, said rocker block having a rocking surface in the shape of a segment of a cylinder, and a rocker block post located at the center of curvature of said base block rocking surface, and
coupling means interconnecting said base block post and said rocker block post, for urging said rocking surfaces into engagement with each other, whereby said rocker block and pivot arm carriage can pivotally rock on said base block, to provide a movable pivot point for said carriage;
capstan means rotatable with respect to said chassis, for simultaneously driving both of said reels by surface engagement with the outermost layer of tape on each reel;
means for simultaneously urging both of said reels into compressive engagement with said capstan means; and
counterweighting means carried by said pivot arm carriages for balancing each of said carriages about its pivot point, whereby the compressive engagement of said reels with said capstan means is maintained when the apparatus is subjected to shock or vibration.

18. In a tape transport apparatus having a chassis, a drive capstan and a pair of tape reels, each reel journaled on a separate carriage and movable into surface engagement with the capstan to drive the tape from one reel to the other, the improvement comprising:
pivotal mounting means associated with each carriage for defining a pivot axis about which the carriage can be pivoted to bring the corresponding tape reel into surface engagement with the capstan; and
counterweighting means associated with each carriage for balancing the weight of the corresponding tape reel about the corresponding pivot axis;
each of said pivotal mounting means including means for moving the corresponding pivot axis in response to a change in the mass of the corresponding tape reel, thereby maintaining the pivot axis substantially at the center of mass of the carriage, the tape reel and the corresponding counterweighting means, and thereby reducing the effects of shock and vibration forces on the degree of surface engagement of the reels with the capstan.

19. A tape transport apparatus as defined in claim 18 wherein each of said pivotal mounting means includes:
a base block secured to said chassis, said base block having a first rocking surface;
a rocker block secured to the corresponding carriage, said rocker block having a second rocking surface; and
coupling means for urging the first and second rocking surfaces into engagement with each other, whereby said rocker block can pivotally rock on said base block, and the instantaneous pivot axis for the corresponding carriage is moved automatically to compensate for changes in mass of the tape reel as the tape is moved from one of the reels to the other.

* * * * *